UNITED STATES PATENT OFFICE.

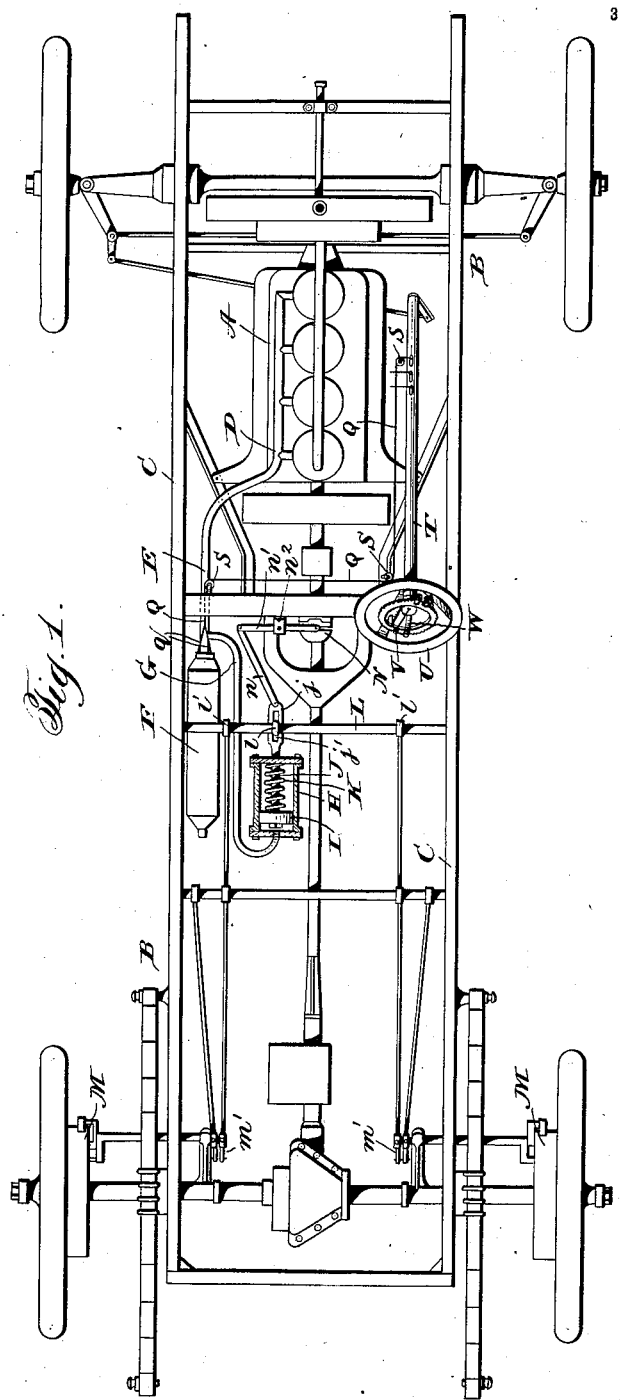

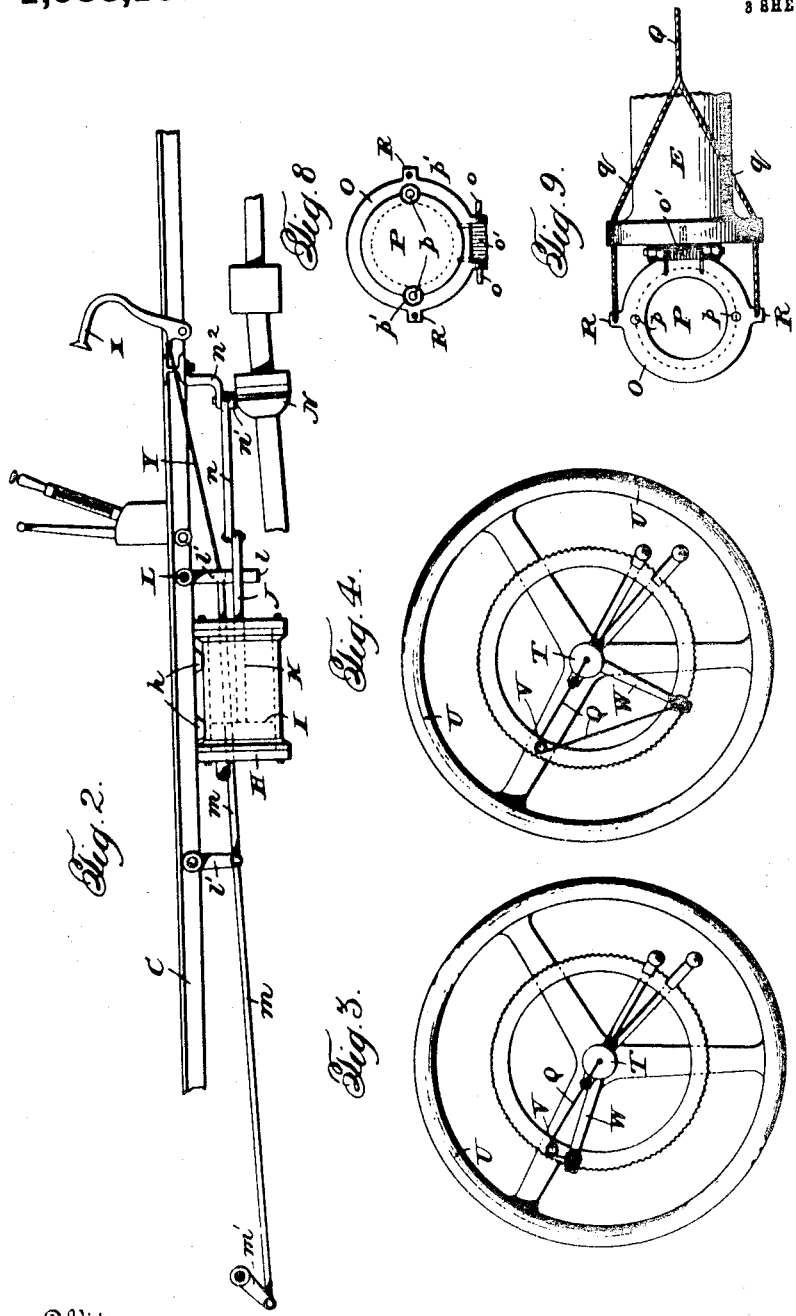

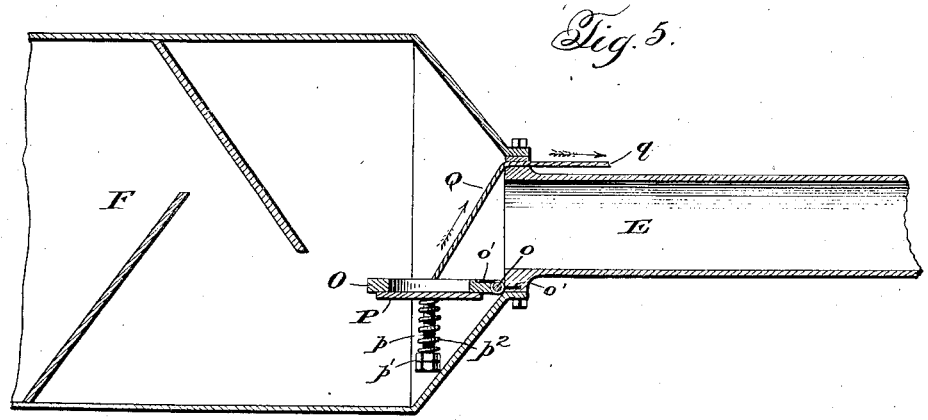
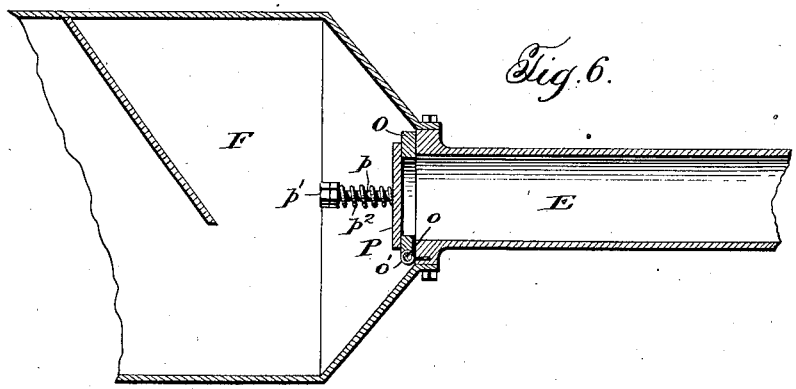
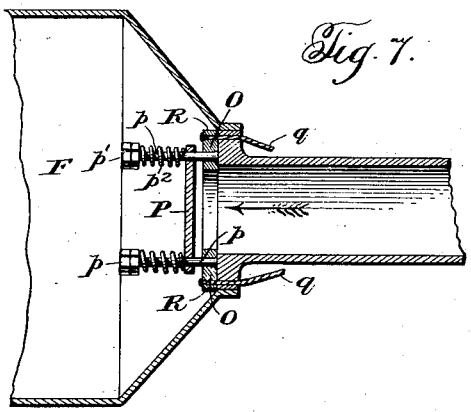

WARREN H. INNIS, JR., OF SACRAMENTO, CALIFORNIA.

AUTO EMERGENCY-BRAKE.

1,088,151.   Specification of Letters Patent.   Patented Feb. 24, 1914.

Application filed April 10, 1913. Serial No. 760,183.

*To all whom it may concern:*

Be it known that I, WARREN H. INNIS, Jr., a citizen of the United States, residing at Sacramento, in the county of Sacramento and State of California, have invented certain new and useful Improvements in Auto Emergency-Brakes, of which the following is a specification, reference being had therein to the accompanying drawing.

This invention relates to improvements in emergency brakes designed particularly for motor driven vehicles, and has for its object, the provision of a brake of the character stated which will be simple in construction, capable of ready application, and efficient in operation.

The preferred embodiment of the invention comprises braking instrumentalities operable independently of the usual foot and hand operable brakes commonly constituting a part of the equipment of motor vehicles, said emergency brake requiring the furnishing of but few additional parts to the ordinary motor vehicle structure; and more specifically an emergency brake operable through the medium of the exhaust gases of the propelling gas engine of the vehicle to apply the braking force in a direct and effective manner, and conveniently also to simultaneously release the clutch between the engine and drive shafts.

The above mentioned preferred embodiment of the invention possesses many characteristic features to be hereinafter more fully described in the appended detailed description, among which may be generally noted a piston within a cylinder adapted to be actuated by the exhaust gases directly associated with a rock shaft, in turn coupled to the brake; means associated with the piston for releasing the clutch; a valve for permitting the exhaust gas to escape or be directed to the cylinder, as the case may be, said valve comprising two members operating conjointly to close the exhaust passage, while being adapted in part to yield under excessive pressure in the brake actuating cylinder to "ease-up," so to speak, the brake-applying pressure, thus avoiding severe locking and skidding of the wheels of the vehicle; and improved means associated with or located adjacent to the steering mechanism for actuating the valve in keeping with the desire of the operator.

The foregoing, together with many other details in construction and arrangement of parts will be more readily understood by reference to the accompanying drawings forming part hereof and wherein the above mentioned preferred embodiment of the invention is illustrated.

In the drawings: Figure 1 is a top plan view, largely diagrammatic and fragmentary, showing my emergency brake applied thereto; Fig. 2 is a fragmentary side elevation of the brake mechanism, associated parts being shown partly in elevation and partly in section; Figs. 3 and 4 are elevations of the steering wheel showing the different positions of the improved brake actuating device; Figs. 5 and 6 are detail sectional views showing the open and closed positions of the valve, with the muffler and exhaust pipe associated therewith; Fig. 7 is a similar view showing the valve members in separated relation to relieve the pressure in the brake cylinder; Fig. 8 is a back view of the valve detached, and Fig. 9 is a top view of the end of the exhaust pipe and the valve connected thereto, the latter being shown in open position.

Referring more specifically to the drawings wherein like reference letters refer to corresponding parts in the several views, A represents the gas engine adapted to propel the vehicle B, said engine being mounted in any convenient or preferred manner upon the chassis or frame C.

D is the exhaust manifold receiving the exhaust gases from the four engine cylinders, opening to a common exhaust pipe E, connected to and opening into one end of a muffler F, the specific construction of which latter need not be herein discussed. At a point between the muffler F and exhaust manifold D, the exhaust pipe E opens to a pipe G connected laterally therewith and leading to the rear end of a brake cylinder H, secured as at *h*, to the vehicle frame, or in any other fixed manner found expedient and practical. The cylinder H is provided with a piston I, having a piston rod J, extending through the forward head or end thereof, a spring K being interposed between said forward end of the cylinder and the piston I, and constantly exerting an expansive influence against the piston to throw the piston to the rear end of the cylinder when otherwise unresisted, as by the pressure of the exhaust gases adapted to operate the piston, to which I shall presently allude. The forward end of the piston rod J is flattened, as at $j$, and slotted as at $j'$, to receive the depending crank or arm $l$ of a horizontal rock shaft L, in turn connected through the medium of depending cranks or arms $l'$, and links $m$ with actuating arms or cranks $m'$ of the brakes M, of any standard or preferred type not constituting part of the present invention. The forward end $j$ of the piston rod is also connected through the medium of a link $n$, to a horizontally disposed lever $n'$, pivoted intermediate of its ends to the frame-work, as at $n^2$, the opposite end of said lever being loosely connected to one member of a clutch N, also conveniently shown, merely in a diagrammatic manner, to illustrate the combination or principle involved herein, the details of the clutch, like the brake, not being essentially involved.

At the mouth of the muffler F, beyond the communication between the end of the pipe G and the exhaust pipe E, I provide a valve consisting of a ring-shaped member O, and disk P, the ring-shaped member being hinged to the end of the exhaust pipe E, as at $o$, and provided with a spring $o'$ acting normally to throw the valve open into the horizontal position illustrated in Fig. 5, when the exhaust gases discharging from the engine into the exhaust pipe E may pass freely into and through the muffler F.

The valve disk P is mounted for a freedom of movement with reference to the valve ring O, through the medium of pins $p$ secured at their ends to opposite portions of the ring O, and passing freely through perforated ears on the disk P, the pins having heads $p'$ at their outer ends, and springs $p^2$ sleeved on the pins and bearing at opposite ends against the disk $p$, and the pin heads $p'$ exerting a constant pressure tending to close and maintain in closed position the disk P, against the ring O, while permitting the disk to yield with reference to the ring under extreme pressures, within the exhaust pipe when the valve is in closed position, as indicated in Fig. 7 wherein the relieving position of the valve is shown.

As a means for operating the valve against the opening pressure of the spring $o'$ in order to close the valve in its seat against the end of the exhaust pipe I provide a wire or cable Q, branched at its ends, as at $q$ to lie adjacent to the opposite sides of the exhaust pipe E and be connected at the terminal portions to alined perforated lugs R, projecting from the opposite sides of the valve ring O. The wire Q is adapted to project along or across the frame of the vehicle, guided by rollers S where necessary, to avoid obstructions, preferably to the lower portion of the usual steering post T, within which it may pass upwardly to a point near the customary steering wheel U where the upper terminal of the wire or cable is passed radially of the wheel through an eye or around a sheave V and connected to the end of an operating lever W. The cable or cord being relaxed, in the first position of the lever the valve is normally permitted to remain open or to automatically open, while the shifting of the lever to its lower or second position, as shown, correspondingly draws the cable upwardly, closing the valve, as will be apparent.

X is the ordinary foot lever, connected through the medium of the link Y to one of the depending arms or cranks $l'$ of the rock shaft L, whereby the brake may be operated by the foot in the usual way, the slot $j'$ in the forward end of the piston rod J permitting the arm $l$ to swing forwardly under the actuation of the foot lever X without effecting the piston I, while on the other hand, said arm $l$ being normally near the rear wall of the slot $j'$, the rock shaft may be promptly actuated by means of said arm upon the forward movement of the piston rod.

From the description hereinabove contained it will be apparent that the operating lever W being in its uppermost position, the valve O—P is normally held open by the spring $o'$ so that a free exhaust is afforded from the engine cylinders A through the manifold D and exhaust pipe E to the muffler F. However, upon merely throwing the lever W to its lower position, the valve O—P is swung upwardly against the pressure of the spring $o'$ and the communication between the exhaust pipe E and muffler obstructed incident to the seating of the valve against said exhaust pipe, so that the exhaust gases will pass through pipe G into the rear end of the cylinder H and force the piston I forwardly in opposition to the spring K, correspondingly actuating the rock shaft L to apply the brakes M and through the link $n$ and pivoted lever $n'$, withdrawing the clutch member N and freeing the drive shaft from the engine. In order to prevent a too severe locking of the wheels and consequent skidding, the valve members O—P are adjusted by means of the heads $p'$, which have a threaded adjustable engagement with the pins $p$ to regulate the pressure of the springs $p^2$ so that when the pressure in the exhaust pipe and cylinder H reaches a predetermined degree the valve disk P will automatically open to permit a partial discharge of the exhaust into the muffler, thereby relieving such pressure and to the same extent easing up the pressure of the braking force. When the pressure is released from the cylinder, the spring K will reset the piston and associated parts to normal position.

While I have herein disclosed one special embodiment of my invention, I desire it understood that the same is capable of embodiment in other forms and arrangements, as will appeal to persons skilled in the art to which the invention relates, and as may be in keeping with the annexed claims.

Having thus described the invention, what is claimed is:—

1. In combination with a brake for motor vehicles, a fluid pressure means for actuating the same, a constantly open source of supply leading directly to said means, a valve located beyond the point of connection between said source of supply and said fluid pressure means, and controlling means for said valve, said valve being formed to relieve abnormal pressure on the brake when the valve is in its closed position.

2. In combination with a brake for motor vehicles, a fluid pressure means for actuating the same, a constantly open source of supply leading directly to said means, a valve located beyond the point of connection between said source of supply and said fluid pressure means, and controlling means for said valve, said valve being formed to relieve abnormal pressure on the brake when the valve is in its closed position, and both the valve and its relief portion being adapted to open outwardly, substantially as described.

3. An emergency brake for motor vehicles comprising braking means, a piston for actuating the same, a source of supply leading to said piston, a valve, controlling means for said valve, said valve being hinged at one edge, and means for normally throwing the same into open position, said valve being formed to relieve the pressure in the cylinder when the valve is in its closed position, substantially as described.

4. A brake for motor vehicles, comprising braking means, fluid pressure means for actuating the same, a source of supply therefor, a valve, controlling means for said valve, said valve being hinged at one edge and adapted to normally open, and means for controlling the valve, said valve being also formed to relieve the pressure on the brake when the valve is in its closed position.

5. An emergency brake for motor vehicles comprising braking instrumentalities, a piston for operating the same, a cylinder for said piston, an exhaust pipe leading from the engine cylinders to said brake cylinder, a valve in said pipe normally held open, and means for closing the valve having an actuating part arranged near the steering mechanism, and a flexible connection running therefrom to the valve, said valve having a yieldable part adapted to relieve gaseous pressure in the cylinder, substantially as described.

6. An emergency brake for motor vehicles comprising braking instrumentalities, a piston for actuating the same, a cylinder for said piston, a source of supply leading to said cylinder, and means automatically regulating the pressure in said cylinder, in combination with means for manually operating said means, substantially as described.

In testimony whereof I affix my signature in presence of two witnesses.

WARREN H. INNIS, Jr.

Witnesses:
H. N. BURLINGHAM,
J. J. HENDERSON.